(12) United States Patent
Binev

(10) Patent No.: US 7,753,455 B2
(45) Date of Patent: Jul. 13, 2010

(54) WORKING MACHINE

(75) Inventor: Binio Binev, Haibach (DE)

(73) Assignee: Linde Material Handling GmbH, Aschaffenburg (DE)

( * ) Notice: Subject to any disclaimer, the term of this patent is extended or adjusted under 35 U.S.C. 154(b) by 1022 days.

(21) Appl. No.: 11/443,514

(22) Filed: May 30, 2006

(65) Prior Publication Data

US 2006/0284478 A1   Dec. 21, 2006

(30) Foreign Application Priority Data

May 31, 2005   (DE) ........................ 10 2005 024 884

(51) Int. Cl.
    *B60T 13/18* (2006.01)
(52) U.S. Cl. ................. 303/11; 303/3; 303/15
(58) Field of Classification Search ................. 188/2–4, 188/10–12, DIG. 4, 358; 303/2–4, 10–12, 303/DIG. 4
See application file for complete search history.

(56) References Cited

U.S. PATENT DOCUMENTS

| 3,802,746 A | 4/1974 | Walser |
| 4,336,860 A | 6/1982 | Noller et al. |
| 5,205,620 A | 4/1993 | Dammeyer et al. |
| 6,179,389 B1 * | 1/2001 | Freitag et al. ............... 303/2 |
| 6,280,002 B1 * | 8/2001 | Goodzey et al. ............. 303/3 |
| 6,698,542 B2 * | 3/2004 | Nishizaki et al. .......... 180/403 |
| 6,814,413 B2 * | 11/2004 | Davison et al. .......... 303/114.1 |
| 7,249,806 B1 * | 7/2007 | Perkins ....................... 303/11 |

FOREIGN PATENT DOCUMENTS

| DE | 197 52 022 A1 | 5/1999 |
| EP | 1312533 A2 | 5/2003 |

* cited by examiner

*Primary Examiner*—Melanie Torres Williams
(74) *Attorney, Agent, or Firm*—The Webb Law Firm

(57) ABSTRACT

A working machine, such as an industrial truck, has working hydraulics, a hydraulic steering device, and a spring-loaded brake. The brake has a braking position and a release position and can be acted upon by a brake-release pressure, which is passed in a brake line, so as to be brought into the release position. A hydraulic pump is provided for the supply to the working hydraulics and the steering device and for producing the brake-release pressure of the spring-loaded brake. The brake line of the spring-loaded brake is connected to a delivery branch line, which is connected to the pump, of the steering device.

10 Claims, 2 Drawing Sheets

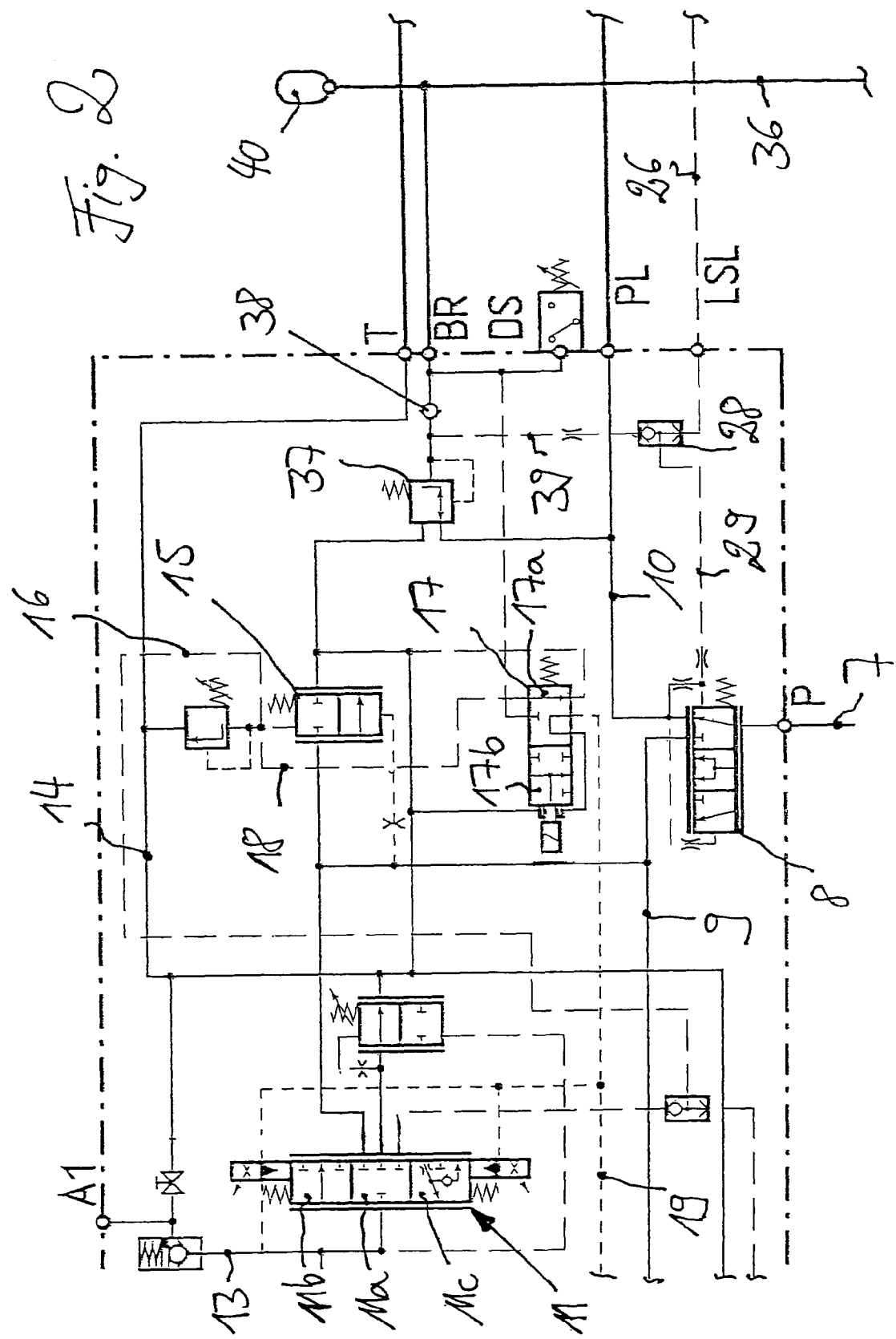

WORKING MACHINE

CROSS-REFERENCE TO RELATED APPLICATION

This application claims priority to German Application No. 10 2005 024 884.5, filed May 31, 2005, which application is herein incorporated by reference in its entirety.

BACKGROUND OF THE INVENTION

1. Field of the Invention

The invention relates to a working machine, such as an industrial truck, having working hydraulics, a hydraulic steering device, and a spring-loaded brake. The brake has a braking position and a release position and can be acted upon by means of a brake-release pressure, which is passed in a brake line, so as to be brought into the release position. A hydraulic pump is provided for the supply to the working hydraulics and the steering device and for producing the brake-release pressure of the spring-loaded brake.

2. Technical Considerations

DE 197 52 022 A1, herein incorporated by reference, discloses a generic working machine in the form of an industrial truck. A hydraulic pump is provided for the supply of hydraulic fluid to the hydraulic steering device, for the supply to the working hydraulics, and for producing a brake-release pressure that acts upon a spring-loaded brake forming a parking brake device so as to bring it into the release position.

In DE 197 52 022 A1, the brake line carrying the brake-release pressure is connected to a delivery branch line, which leads to the working hydraulics and is connected to the pump. In order to release the spring-loaded brake and, thus, to produce a brake-release pressure arising in the brake line, an additional valve is required, which acts upon a pressure balance, which controls the connection between the delivery branch line of the working hydraulics and a tank, so as to bring it into a blocking position. When producing the brake-release pressure passed in the brake line and, thus, when releasing the spring-loaded brake, the pressure balance is acted upon so as to be brought into the blocking position. As a result of which, the load-independent control of the consumers of the working hydraulics is brought out of operation given a simultaneous actuation of the working hydraulics, and a minimum delivery pressure arises in the delivery branch line of the working hydraulics. This minimum delivery pressure corresponds to the brake-release pressure, which results in a high energy requirement.

In addition, generic working machines are known in which the brake line is connected to the delivery branch line of the working hydraulics. The brake line is connected to a control face, which acts in the direction of the blocking position, of a pressure balance, which controls the connection between the delivery branch line of the working hydraulics and a tank. The control face, which acts in the direction of the blocking position, of the pressure balance is relieved of load by means of a safety valve in a safety position of the safety valve to the tank. In an operating position of the safety valve, the connection of the control face to the tank is blocked. With such a working machine, the safety valve is acted upon so as to be brought into the operating position for the purpose of releasing the spring-loaded brake and, thus, for the purpose of producing the brake-release pressure. Owing to the brake-release pressure arising at the control face, which acts in the direction of the blocking position, of the pressure balance, the delivery pressure produced by the pump is determined by the brake-release pressure. As a result of which, given a simultaneous actuation of the working hydraulics, a load-independent control of the consumers of the working hydraulics is not made possible in the case of a load pressure of the consumer of the working hydraulics, which falls below the brake-release pressure. In addition, if only the working hydraulics are actuated by the pressure balance being acted upon by the brake-release pressure in the delivery branch line of the working hydraulics, a minimum delivery pressure arises, which corresponds to the brake-release pressure, which results in a high energy consumption. Owing to the fact that the safety valve is acted upon so as to be brought into the operating position for the purpose of producing a brake-release pressure, in addition the safety function is brought out of operation, it being possible for an uncontrolled and arbitrary movement of the consumer of the working hydraulics to take place in the event of a control slide of a control valve, which controls a consumer of the working hydraulics, becoming stuck.

SUMMARY OF THE INVENTION

The present invention is based on the object of making available a working machine of the generic type mentioned initially which is improved as regards the energy requirement and operational reliability.

This object is achieved, according to the invention, by the fact that the brake line of the spring-loaded brake is connected to a delivery branch line, which is connected to the pump, of the steering device. Owing to the connection of the brake line to the delivery branch line of the steering device, independent actuation of the working hydraulics is made possible when the brake-release pressure is produced, it being possible for the consumers of the working hydraulics to be operated with the respective load pressure. The minimum delivery pressure arising in the delivery branch line of the working hydraulics is, in this case, determined from the load pressure of the consumers of the working hydraulics, independently of the brake-release pressure, which results in a low energy requirement. When a brake-release pressure of the spring-loaded brake is produced and, thus, the spring-loaded brake is released and, at the same time, one or more consumers of the working hydraulics are actuated, a load-independent operation of the consumers of the working hydraulics is thus made possible, in which case a low energy consumption is also achieved when only the working hydraulics are actuated.

Particular advantages result if the delivery branch line of the steering device is connected to the output of a priority valve, to the output side of which a delivery branch line of the working hydraulics is connected and to the input side of which a delivery line, which is connected to the pump, is connected, it being possible for the priority valve to be acted upon by the load pressure of the steering device or the brake-release pressure arising in the brake line in the direction of a switching position, which connects the delivery line to the delivery branch line of the steering device. The priority valve being acted upon by the load pressure of the steering device or the brake-release pressure makes possible energy-saving operation of the steering device depending on the load pressure of the steering device when the steering device is actuated on its own. When the working hydraulics are actuated and the pump is used for releasing the spring-loaded brake at the same time, the priority valve makes possible energy-saving and load-independent operation of the consumers of the working hydraulics depending on the load pressure of the working hydraulics.

In accordance with one preferred refinement of the invention, the brake line is connected to the input of a shuttle valve device, in particular a shuttle valve, the shuttle valve device being connected on the input side to a load pressure signal line, which carries the load pressure of the steering device, and on the output side to a branch line, which acts upon the priority valve in the direction of the switching position, which connects the delivery line of the pump to the delivery branch line of the steering device. With such a shuttle valve device it is possible for the priority valve to be acted upon in a simple manner either by the brake-release pressure arising in the brake line or by the load pressure of the steering device. As a result of which, energy-saving operation of the steering device is made possible when the steering device is actuated on its own and the priority valve is controlled depending on the higher pressure when the spring-loaded brake is released and the steering device is actuated at the same time.

A branch line, which leads to the shuttle valve device, is expediently connected to the brake line. A blocking valve, such as a non-return valve, which opens in the direction towards the spring-loaded brake, is arranged downstream of the connection of the branch line in the brake line. With such a blocking valve, the brake-release pressure arising in the brake line can be maintained in a simple manner.

Particular advantages result if the brake line is connected to the delivery branch line of the steering device by means of a pressure-reducing device, such as a pressure reduction valve. With a pressure reduction valve it is possible for the maximum delivery pressure, which arises in the delivery branch line of the steering device, of the pump to be lowered to the pressure level for the brake-release pressure, which is required for releasing the spring-loaded brake, with little complexity in terms of design.

In accordance with one advantageous development of the invention, the working hydraulics have an associated safety device which, in a safety position, connects the delivery branch line of the working hydraulics to a tank and/or relieves the control pressure supply of the control valves, which control the consumers of the working hydraulics, to the tank. Owing to the fact that the brake line is connected to the delivery branch line of the steering device, no driving of the safety device is required for releasing the spring-loaded brake. As a result of which, it is possible for the safety device to continue to be acted upon so as to be brought into the safety position when the spring-loaded brake is released and when the working hydraulics are not actuated. As a result, the safety function is likewise maintained when the spring-loaded brake is released, with the result that an uncontrolled and arbitrary movement of the consumer of the working hydraulics can be effectively avoided when the spring-loaded brake is released and in the event of a control slide of a control valve of the working hydraulics becoming stuck.

In accordance with one expedient refinement of the invention, the safety device is in the form of a safety valve, which can be actuated electrically, in particular by means of a switching magnet, and has a safety position, in which a load pressure signal line of the working hydraulics which is connected to a delivery flow regulating device of the working hydraulics, in particular a pressure balance, which controls the connection of the delivery branch line of the working hydraulics to a tank, and/or a control pressure supply line for the control valves of the working hydraulics is connected to a tank, and has an operating position, in which the connection of the load pressure signal line to the tank is blocked and/or the control pressure supply line is connected to a control pressure supply. With such a safety valve, it is possible in a simple manner to prevent an undesired and arbitrary actuation of the consumers of the working hydraulics in the safety position.

BRIEF DESCRIPTION OF THE DRAWINGS

Further advantages and details of the invention will be explained in more detail with reference to the exemplary embodiment illustrated in the schematic figures, in which like reference numbers identify like parts throughout.

FIG. 2 shows a detail of FIG. 1, in an enlarged illustration.

DESCRIPTION OF THE PREFERRED EMBODIMENTS

Figure 1:
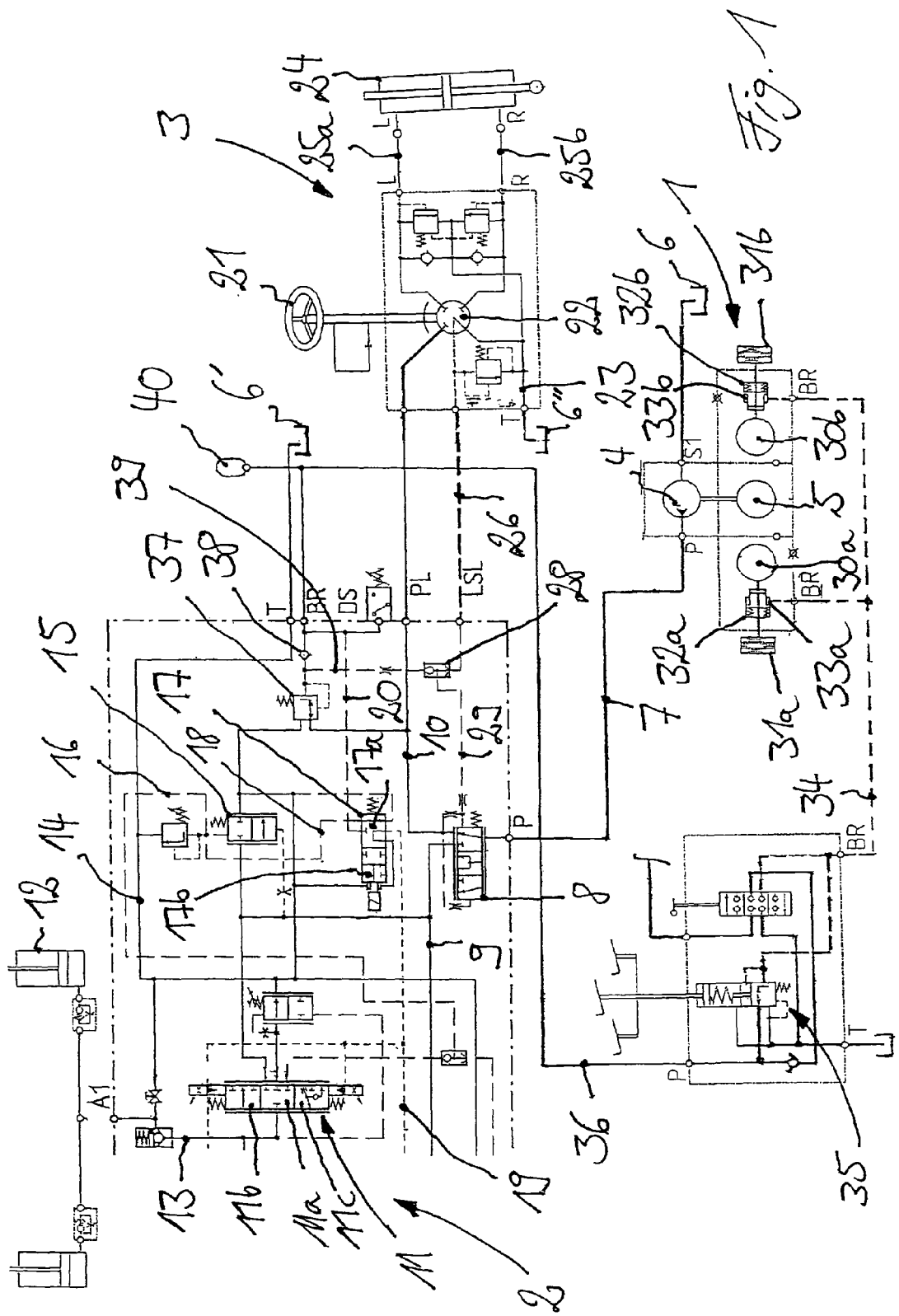
FIG. 1 shows the hydraulic circuit diagram of a working machine according to the invention.

FIG. 1 illustrates a hydraulic circuit diagram of a working machine in the form of an industrial truck. The industrial truck has a spring-loaded brake 1, working hydraulics 2, and a hydraulic steering device 3, a common pump 4 being provided for the supply to the spring-loaded brake 1, the working hydraulics 2, and the steering device 3. In this case, the pump 4 is operatively connected to a drive motor 5 in the form of an electric motor or a combustion engine and draws pressure medium from a tank 6 and delivers into a delivery line 7.

The delivery line 7 is connected on the input side to a priority valve 8, which is provided for the preferred supply to the hydraulic steering device 3. The priority valve 8 is connected on the output side to a delivery branch line 9 of the working hydraulics 2 and to a delivery branch line 10 of the steering device 3.

The working hydraulics 2 comprise (as can be seen in FIG. 2) a control valve 11 for controlling a lifting drive 12 and control valves (not illustrated in any detail) for controlling an inclination drive and at least one additional drive for the industrial truck. The control valve 11 has a neutral position 11a, a lowering position 11b for the purpose of lowering the load on the lifting drive 12, and a raising position 11c for the purpose of raising the load on the lifting drive 12. In the raising position 11c of the control valve 11, a control line 13, which leads to the lifting drive 12, is connected to the delivery branch line 9 of the working hydraulics 2. In the lowering position 11b of the control valve 11, the control line 13 is connected to a tank line 14, which leads to a tank 6'.

The delivery branch line 9 of the working hydraulics 2 has an associated delivery flow regulating device 15, which is in the form of a pressure balance and controls the connection between the delivery branch line 9 of the working hydraulics and the tank line 14 and, thus, the tank 6'. The delivery flow regulating device 15 is, in this case, acted upon by the delivery pressure arising in the delivery branch line 9 in the direction of a passage position, which connects the connection of the delivery branch line 9 to the tank line 14, and by a spring as well as a load pressure, which arises in a load pressure signal line 16 of the working hydraulics, of the consumers of the working hydraulics in the direction of a blocking position, which blocks the connection between the delivery branch line 9 and the tank line 14.

A control line 18 branches off from the load pressure signal line 16 and is connected to a safety device 17, which is in the form of a safety valve which can be actuated electrically, by means of a switching magnet. The safety device 17 has a safety position 17a and an operating position 17b, the control line 18 being connected to the tank line 14 in the safety position 17a illustrated. When the switching magnet is actuated, the safety device 17 can be acted upon so as to be brought into the operating position 17b, in which the control line 18 is blocked off.

The control valves of the working hydraulics can be actuated by means of a control pressure arising in a control pressure supply line 19, the control pressure supply line 19 being connected to the safety device 17. In the safety position 17a of the safety device 17, the control pressure supply line 19 is connected to the tank line 14. In the operating position 17b of the safety device 17, the control pressure supply line 19 is connected to a supply line 20.

The steering device 3 has a steering angle sensor 21, for example a steering wheel, which is operatively connected, by means of a steering shaft, to a steering valve 22, which is in the form of, for example, a steering orbitrol. The steering valve 22 is connected to the delivery branch line 10 of the steering device 3 and a tank line 23, which leads to a tank 6". The steering device 3 also has a steering drive 24, which is in the form of, for example, a dual-action steering cylinder, which is arranged on a steering axle of the industrial truck and is operatively connected to the steered wheels in a manner which is not illustrated in any more detail, the steering valve 22 being connected to the steering cylinder 24 by means of control lines 25a, 25b. The steering valve 22 is connected to a load pressure signal line 26, which senses the load pressure of the steering device 3 and is connected to the input of a shuttle valve device 28 in the form of a shuttle valve.

The shuttle valve device 28 is connected on the output side to a branch line 29, which is connected to a control pressure space which acts upon the priority valve 8 in the direction of a switching position, which connects the delivery line 7 of the pump 4 to the delivery branch line 10 of the steering device 3. The priority valve 8 is, likewise, acted upon by a spring in the direction of this switching position. The priority valve 8 is acted upon by the pressure arising in the delivery branch line 10 of the steering device 3 in the direction of a switching position, which connects the delivery line 7 to the delivery branch line 9 of the working hydraulics 2.

The spring-loaded brake 1 is assigned to a traction drive, which is formed by traction motors 30a, 30b, for example hydraulic motors or electric motors, and is operatively connected to drive wheels (not illustrated in any detail). The spring-loaded brake 1 comprises, for example, brake devices 31a, 31b, which are in the form of multiple-disc brakes, and can be acted upon by means of an actuating device 32a, 32b so as to be moved between a release position and a braking position. The actuating device 32a, 32b comprises an actuating piston, which can be acted upon by a spring in the direction of the braking position of the brake devices 31a, 31b. A control pressure space 33a, 33b, which acts in the direction of the release position of the brake devices 31a, 31b and, thus, counter to the spring and is connected to a brake-release line 34 carrying a brake-release pressure, is also formed on the actuating piston.

The brake-release line 34 is connected to the output of a brake valve 35, which is in the form of a pressure reduction valve, and is connected on the input side to a brake line 36. According to the invention, the brake line 36 is connected to the delivery branch line 10 of the steering device 3, with the interconnection of a pressure-reducing device 37 in the form of a pressure reduction valve.

A blocking valve 38, which is in the form of a non-return valve and is open in the direction towards the brake valve 35, is arranged in the brake line 36, which leads from the pressure-reducing device 37 to the brake valve 35. Downstream of the blocking valve 38, a pressure medium store 40 is connected to the brake line 36.

A branch line 39, which is connected to a further input of the shuttle valve device 28, is connected to the brake line 36 between the pressure-reducing device 37 and the blocking valve 38.

The supply line 20, which is connected to the safety device 17, is connected to the brake line 36, downstream of the blocking valve 38.

In order to release the spring-loaded brake 1 and, thus, to produce a brake-release pressure which arises in the brake line 36 and acts upon the spring-loaded brake 1 so as to bring it into the release position, the priority valve 8 is in the switching position illustrated in FIGS. 1 and 2 in which the delivery line 7 of the pump 4 is connected to the delivery branch line 10 of the steering device 3. Via the branch line 39, the shuttle valve device 28, and the branch line 29, the priority valve 8 is acted upon by the brake-release pressure arising in the brake line 36, as a result of which the delivery pressure of the pump 4 is determined by the brake-release pressure.

When the steering device 3 is actuated on its own, the priority valve 8 is acted upon by the load pressure of the steering device arising in the load pressure signal line 26, as a result of which the delivery pressure of the pump 4 is determined by the load pressure of the steering device 3, and, thus, the steering device 3 can be actuated with a low energy requirement.

When the spring-loaded brake 1 is released and the steering device 3 is actuated at the same time, the priority valve 8 is acted upon by means of the shuttle valve device 28 by the brake-release pressure or the load pressure of the steering device 3 arising in the load pressure signal line 26. The delivery pressure of the pump 4 is thus determined by the brake-release pressure, which exceeds the load pressure of the steering device 3, or the load pressure of the steering device 3, which exceeds the brake-release pressure, which results in a low energy requirement. If the load pressure of the steering device 3 exceeds the brake-release pressure, the brake-release pressure arising in the brake line 36 is limited by the pressure-reducing device 37 in the form of a pressure reduction valve.

In order to release the spring-loaded brake 1, when the steering device 3 is actuated on its own or when the spring-loaded brake 1 is released and the steering device 3 is actuated at the same time, the safety device 17 is not driven and is in the safety position 17a in which the load pressure signal line 16 of the working hydraulics 2 and the control pressure supply line 19 are connected to the tank 6'. Owing to the fact that the control pressure supply line 19 is connected to the tank 6', the control valves 11 of the working hydraulics 2 are acted upon so as to be brought into the neutral position 11a. The delivery flow regulating device 15 is, in this case, acted upon by the delivery flow of the pump 4, which flows in the delivery branch line 9 and exceeds the requirement of the spring-loaded brake 1 and/or the steering device 3 so as to be brought into the passage position, as a result of which it is possible for the excess delivered pressure medium flow from the pump 4 to flow away to the tank 6. Uncontrolled and arbitrary actuation of the consumers of the working hydraulics 2 in the event of a control slide of a control valve becoming stuck can thus be effectively prevented by means of the safety device 17 when the spring-loaded brake 1 is released, when the steering device 3 is actuated on its own or when the spring-loaded brake 1 is released and the steering device 3 is actuated at the same time.

When the working hydraulics 2 are actuated on their own, the safety device 17 is acted upon so as to be brought into the operating position 17b. The control pressure supply line 19 is connected to the supply line 20, which branches off from the brake line 36, for the purpose of actuating the control valves. The priority valve 8 is, in this case, acted upon by the pressure arising in the delivery branch line 10 of the steering device 3, counter to the spring acting on the priority valve 8, in the direction of the switching position which connects the delivery line 7 to the delivery branch line 9 of the working hydraulics 2. Load-independent operation of the consumers of the working hydraulics 2 is made possible via the delivery flow regulating device 15 in the form of a pressure balance, the delivery pressure of the pump 4, in particular the minimum delivery pressure arising in the delivery branch line 9 of the working hydraulics, being determined by the load pressure of the driven consumers of the working hydraulics 2, which results in a low energy requirement.

When the spring-loaded brake 1 is released and, thus, when a brake-release pressure is produced in the brake line 36 and the working hydraulics 2 are actuated at the same time, a preferred supply to the spring-loaded brake 1 is ensured by the priority valve 8. Load-independent operation of the consumers of the working hydraulics 2 is made possible by means of the delivery flow regulating device 15 even in operating states in which the brake-release pressure exceeds the greatest load pressure of the consumers of the working hydraulics 2.

Owing to the fact that the brake line 36 is connected, according to the invention, to the delivery branch line 10 of the steering device 3, it is thus possible for the delivery pressure of the pump 4 to be determined by the greatest load pressure of the driven consumers of the working hydraulics 2 when the working hydraulics 2 are actuated on their own, as a result of which load-independent operation of the consumers of the working hydraulics 2 and a low energy consumption are achieved.

In addition, the safety device 17 is controlled exclusively by the actuation of the working hydraulics 2 and, thus, is only acted upon so as to be brought into the operating position 17b when the working hydraulics 2 are actuated. When the spring-loaded brake 1 is released, the safety device 17 is in the safety position 17a, as a result of which it is not necessary for the safety function to be interrupted by means of an actuation of the safety device 17 so as to bring it into the operating position 17b when the spring-loaded brake 1 is released, and thus a high degree of operational reliability of the working machine is achieved.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A working machine, comprising:
    working hydraulics;
    a hydraulic steering device;
    a spring-loaded brake, the brake having a braking position and a release position, the brake being acted upon by a brake-release pressure passed via a brake line so as to be brought into the release position; and
    a hydraulic pump provided for supplying fluid to the working hydraulics and the steering device and for producing the brake-release pressure of the spring-loaded brake,
    wherein the brake line of the spring-loaded brake is connected to a delivery branch line of the steering device that is connected to the pump.

2. The working machine according to claim 1, wherein the delivery branch line of the steering device is connected to the output of a priority valve, to the output side of which a delivery branch line of the working hydraulics is connected and to the input side of which a delivery line, which is connected to the pump, is connected, and
    wherein the priority valve is acted upon by a load pressure of the steering device or the brake-release pressure arising in the brake line in the direction of a switching position, which connects the delivery line of the pump to the delivery branch line of the steering device.

3. The working machine according to claim 2, wherein the brake line is connected to the input of a shuttle valve device, the shuttle valve device being connected on the input side to a load pressure signal line that carries the load pressure of the steering device, and on the output side to a branch line that acts upon the priority valve in the direction of the switching position that connects the delivery line of the pump to the delivery branch line of the steering device.

4. The working machine according to claim 3, including a branch line that leads to the shuttle valve device, wherein the branch line of the shuttle valve device is connected to the brake line, and wherein a blocking valve, which opens in the direction towards the spring-loaded brake, is arranged downstream of the connection of the branch line to the brake line.

5. The working machine according to claim 1, wherein the brake line is connected to the delivery branch line of the steering device by a pressure-reducing device.

6. The working machine according to claim 2, wherein the working hydraulics include an associated safety device which, in a safety position, connects the delivery branch line of the working hydraulics to a tank and/or relieves the control pressure supply of the control valves that control the consumers of the working hydraulics to the tank.

7. The working machine according to claim 6, wherein the safety device includes a safety valve, which is actuated electrically by a switching magnet, the safety valve having a safety position in which a load pressure signal line of the working hydraulics that is connected to a delivery flow regulating device of the working hydraulics in the form of a pressure balance that controls the connection of the delivery branch line of the working hydraulics to the tank and/or a control pressure supply line for the control valves of the working hydraulics is connected to the tank, and wherein the safety valve has an operating position in which the connection of the load pressure signal line to the tank is blocked and/or the control pressure supply line is connected to a control pressure supply.

8. The working machine according to claim 1, wherein the working machine is an industrial truck.

9. The working machine according to claim 4, wherein the blocking valve is a non-return valve.

10. The working machine according to claim 5, wherein the pressure-reducing device comprises a pressure reduction valve.

* * * * *